United States Patent [19]

Suzuki

[11] Patent Number: 4,779,271
[45] Date of Patent: Oct. 18, 1988

[54] FORCED ERROR GENERATING CIRCUIT FOR A DATA PROCESSING UNIT

[75] Inventor: Hiroshi Suzuki, Kamakura, Japan
[73] Assignee: Mitsubishi Denki Kabushiki Kaisha, Tokyo, Japan
[21] Appl. No.: 928,380
[22] Filed: Nov. 10, 1986
[30] Foreign Application Priority Data
Nov. 11, 1985 [JP] Japan .................................. 60-250879
[51] Int. Cl.$^4$ ............................................. G06F 11/00
[52] U.S. Cl. ......................................................... 371/3
[58] Field of Search .............................. 371/3, 23, 27; 324/73 R, 73 AT; 364/200 MS File, 900 MS File

[56] References Cited
U.S. PATENT DOCUMENTS
3,401,379  9/1968  Prell ........................................ 371/3
4,669,081  5/1987  Mathewes ............................... 371/3

FOREIGN PATENT DOCUMENTS
143645  9/1982  Japan ...................................... 371/3

OTHER PUBLICATIONS
D. G. East, "Error Injector for Testing a Data Processing Unit", IBM TDB, vol. 17, No. 6, Nov. 1974, pp. 1691–1692.
J. N. Gaulrapp, "Error Injector Tool", IBM TDB, vol. 20, No. 8, Jan. 1978, p. 3286.

Primary Examiner—Jerry Smith
Assistant Examiner—Robert W. Beausoliel
Attorney, Agent, or Firm—Oblon, Fisher, Spivak, McClelland & Maier

[57] ABSTRACT

A forced error generating circuit for a data processing unit comprises a forced error register for generating a designation signal to forcibly cause an error for a structural element in the data processing unit and a signal generating means which receives a signal for starting a period for causing the error by a forced error generating instruction and generates a forced error generating signal corresponding to said designation signal during said period.

1 Claim, 6 Drawing Sheets

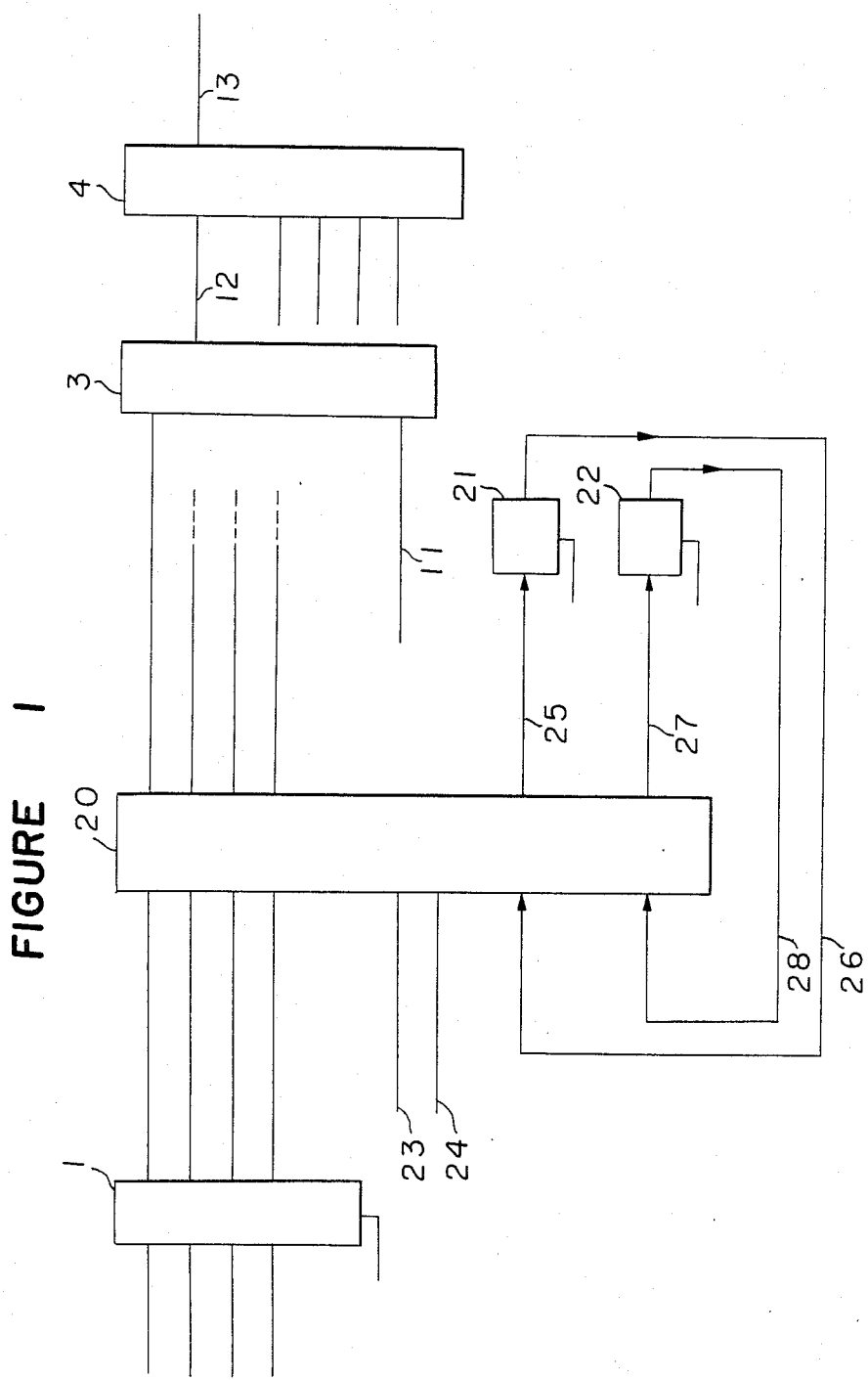

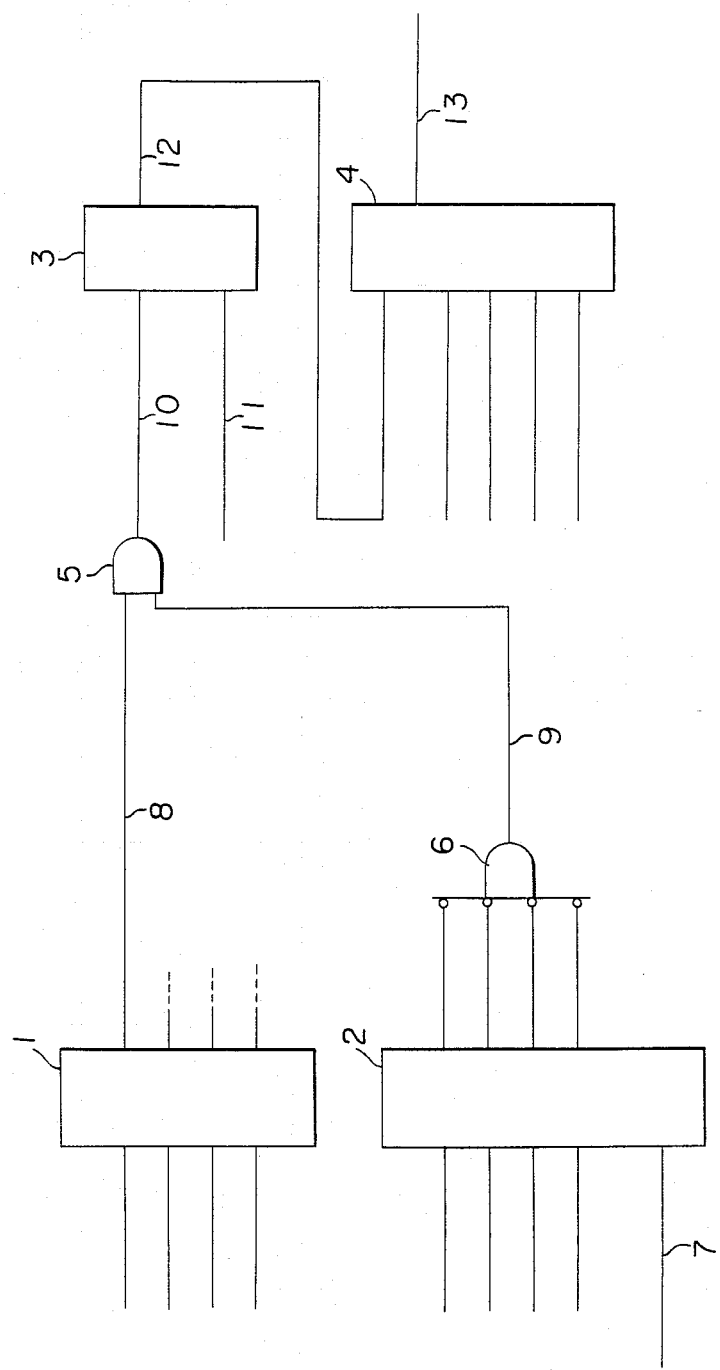

FORCED ERROR GENERATING CIRCUIT FOR A DATA PROCESSING UNIT

BACKGROUND OF THE INVENTION

1. Field of the Invention

The present invention relates to a forced error generating circuit for a data processing unit comprising a number of structural elements. More particularly, it relates to such circuit for inspecting whether or not the function for error detection of the data processing unit is correctly operated, by forcibly causing error in each of the structural elements.

2. Background Information

FIG. 3 is a block diagram of a conventional forced error generating circuit for a data processing unit. In FIG. 3, a reference numeral 1 designates a forced error register in which data "0" to "3" are input, a numeral 2 designates a counter in which data "4" to "7" are input, a numaral 3 designates an error generating circuit, a numeral 4 designates an error detecting circuit, a numeral 5 designates an AND gate, a numeral 6 designates a NAND gate, a numeral 7 designates a count-down starting signal for starting count down, a numeral 8 designates a forced error designation signal outputted from the forced error register 1, a numeral 9 designates a forced error controlling signal outputted from the counter 2, a numeral 10 designates a forced error generating signal outputted from the AND gate 5, a numeral 11 designates a parity which is inputted into the error generating circuit 3 to be used for data "8" to "11", a numeral 12 designates a parity as an output from the error generating circuit 3 which is inputted into the error detecting circuit 4 to be used for data "8" to "11", and the numeral 13 designates an error detecting signal outputted from the error detecting circuit 4.

The operation of the conventional forced error generating circuit will be described. By the execution of a forced error generating instruction for diagnosis, data "0" to "3" each of which specifies each structural element from which error is forcibly produced, are inputted into the forced error register 1 and are set therein, whereby the forced error designation signal 8 corrsponding to any one of the structural elements in which the error is forcibly produced, becomes significant. Then, values specified by the data "4" to "7" are set in the counter 2, and the count-down starting signal 7 is made significant. Then, the data "4" to "7" as the content of the counter 2 are sequentially counted down for each machine cycle. When outputs "0" to "3" to be produced from the counter 2 do not appear at all, the forced error controlling signal 9 is provided from the NAND gate 6.

Subsequent to the forced error designation signal 8 made previously significant, when the forced error controlling signal 9 becomes significant, the forced error generating signal 10 is provided from the AND gate 5. Under the normal condition that the forced error generating signal 10 is not significant, the error generating circuit 3 outputs the parity 11 for data "8" to "11" as the parity 12. The error detecting circuit 4 receives the data "8" to "11" and the parity 12 to conduct a parity check. When a parity error is found in the parity check, the error detecting signal 13 is made significant.

On the other hand, when the forced error generating signal 10 is made "signficant" by the execution of the forced error generating instruction for diagnosis, the error generating circuit 3 reverses the inputted parity 11 to output it as the parity 12. Thus, since the parity for the data "8" to "11" to be inputted into the error detecting circuit 4 is reversed, the parity check makes the error detecting signal 13 significant. Thus, the correct functioning of the detecting circuit 4 is confirmed.

While the conventional forced error generating circuit having the construction as above-mentioned has an advantage that timing of forcibly causing of the error can be finely adjusted by suitably selecting a proper sitting for the initial constant for the counter, it has the drawbacks that it is impossible to forcibly produce the error in order to conduct inspection unless an operator is not well acquainted with the function of the instructions and hardware used and it is necessary to use a number of the hardware such as the counter.

SUMMARY OF THE INVENTION

It is an object of the present invention to provide a forced error generating circuit for a data processing unit which enables an operator to inspect the function of error detection by forcibly causing error without his knowledge of the instructions for the hardware of the data processing unit.

It is another object of the present invention to provide a forced error generating circuit with simple and small number of the hardware.

The foregoing and the other objects of the present invention have been attained by providing a forced error generating circuit for a data processing unit which comprises a forced error register for generating a designation signal to forcibly cause an error for a structural element in the data processing unit and a signal generating means which receives a signal for starting a period for causing the error by a forced error generating instruction and generates a forced error generating signal corresponding to the designation signal during the period.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a block diagram showing an embodiment of the forced error generating circuit according to the present invention;

FIG. 3 is a block diagram showing a conventional or prior art error generating circuit for a data processing unit.

DETAILED DESCRIPTION OF PREFERRED EMBODIMENTS

Figure 1A:
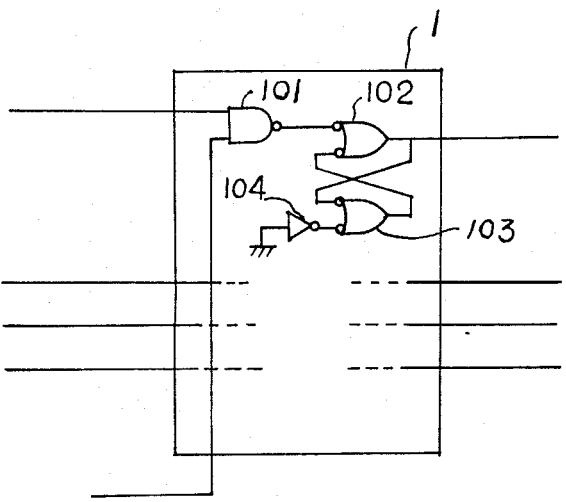
FIG. 1a is a diagram showing an embodiment of the logic circuit of a forced error register used in the forced error generating circuit of the present invention.

Preferred embodiments of the present invention will be described with reference to the accompanying drawings, wherein the same reference numerals designate the same or corresponding parts.

In FIG. 1, a reference numeral 20 designates a forced error controlling circuit, numerals 21 and 22 designate latches, a numeral 23 designates a forced error generating instruction signal indicative of the execution of the forced error generating instruction, a numeral 24 designates an instruction starting signal which gives an instruction for starting, a numeral 25 designates a forced error generating instruction A signal indicative of the execution of the forced error generating instruction outputted from the forced error controlling circuit 20, a numeral 26 designates a forced error generating instruction B signal provided by latching the forced error generating instruction A signal 25, a numeral 27 designates a forced error controlling A signal to be outputted from the forced error controlling circuit 20, and a numeral 28 designates a forced error controlling B signal provided by latching the forced error controlling A signal 27. Clock signals T3, T2 and T0 are respectively to be inputted into the forced error register 1, and the latches 21 and 22.

FIGS. 1a to 1e respectively show an embodiment of each of the forced error register 1, the forced error controlling circuit 20, the error generating circuit 3, the error detecting circuit 4 and the latches 21, 22, all of which comprise a logic circuit.

In FIG. 1a, the forced error register 1 is constituted by a plurality of logic circuits each comprising a NAND circuit 101, OR circuits 102, 103 having the same function as the NAND circuit and reversing two input signals, and an inverter (NOT) circuit 104. The logic circuit is provided for each of the data "0" to "3". In FIG. 1, only one logic circuit for the data "0" is shown for simplification of the drawing.

Figure 1E:
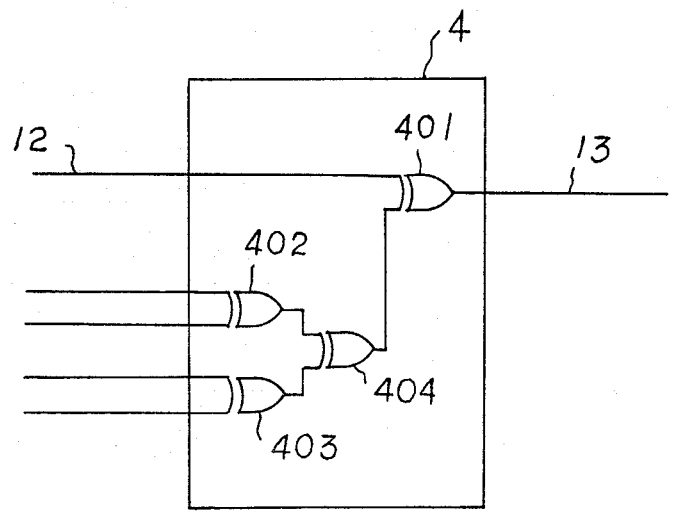
FIG. 1e is a diagram showing an embodiment of the logic circuit of an error detecting circuit used for the present invention.
Figure 1B:
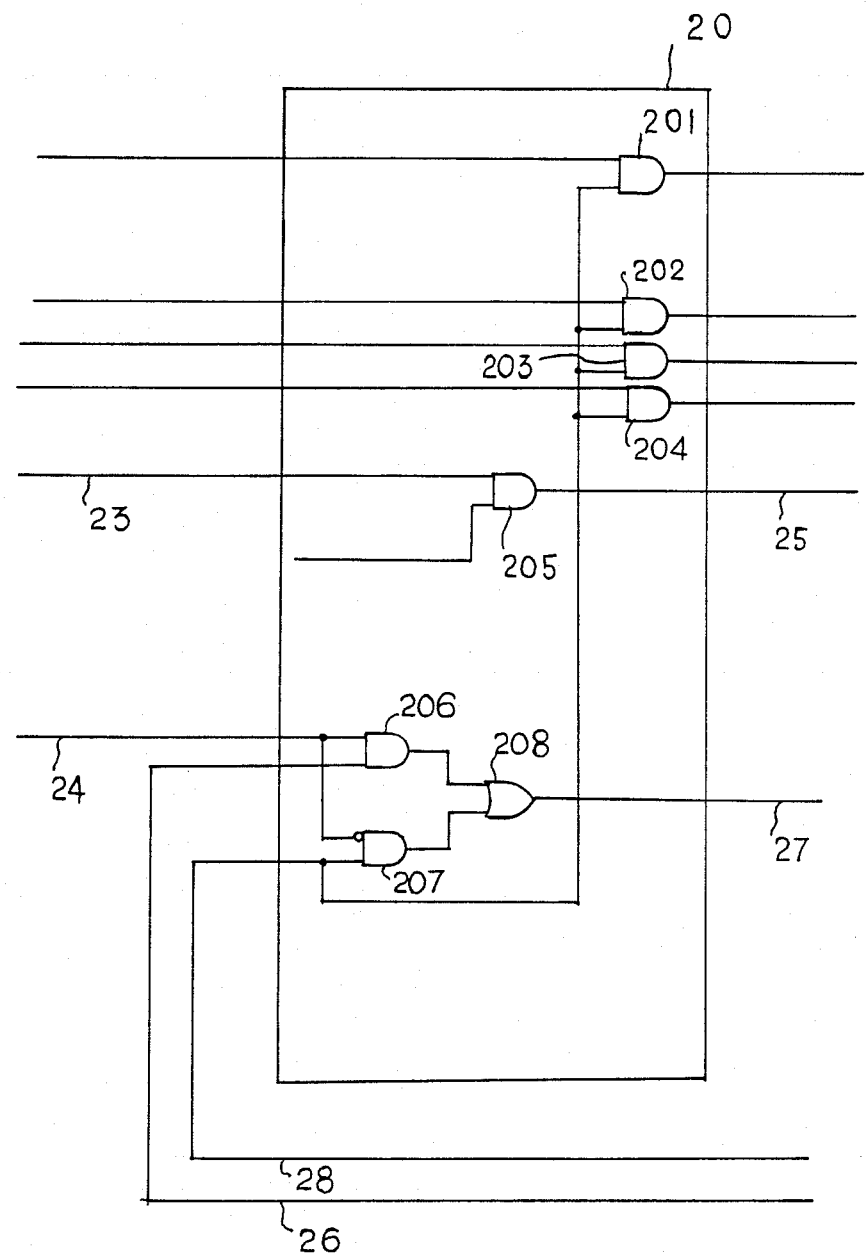
FIG. 1b is a diagram showing an embodiment of the logic circuit of a forced controlling circuit used for the present invention.

In FIG. 1b, the forced error controlling circuit 20 is constituted by AND circuits 201, 202, 203, 204, 205 and 206, an AND circuit 207 for reversing an input signal and an OR circuit 208. In the controlling circuit 20, an instruction ending signal is inputted at an input terminal of the AND circuit 205. The signal is assumed to be "H" ("1") level in the last machine cycle and to be "L" ("0") in the machine cycle other than the last machine cycle.

Figure 1C:
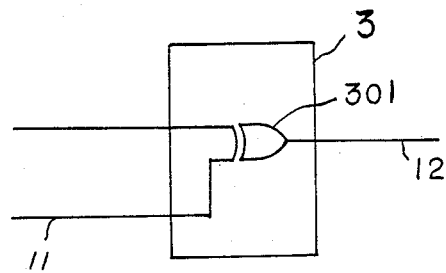
FIG. 1c is a diagram showing an embodiment of the logic circuit of an error generating circuit used for the present invention.

As shown in FIG. 1c, the error generating circuit 3 is constituted by an exclusive OR circuit 301.

Figure 1D:
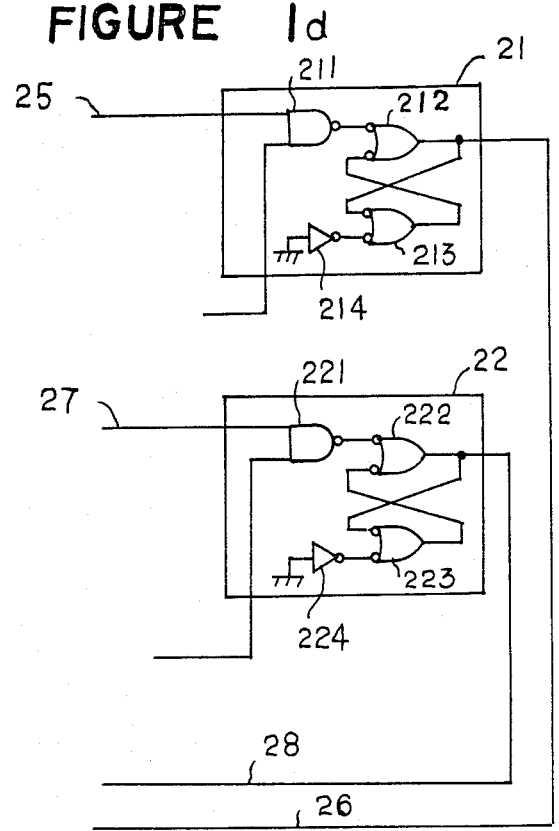
FIG. 1d is a diagram showing an embodiment of the logic circuit of latches used for the present invention.

In FIG. 1d, the latches 21, 22 have the same construction and each of them is constituted by a NAND circuit 211 or 221, OR circuits 212, 213 or 222, 223 for reversing two input signals and an inverter circuit 214 or 224.

In FIG. 1e, the error detecting circuit 4 is constituted by four exclusive OR circuits 401 to 404.

Figure 2:
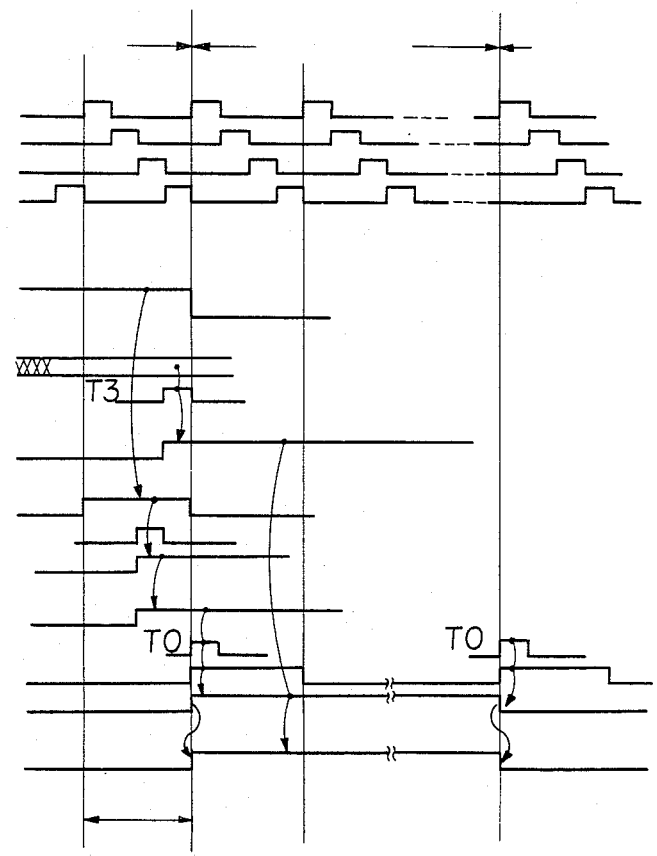
FIG. 2 is a timing chart showing the operation of the circuit as shown in FIG. 1.

The operation of the forced error generating circuit of the present invention will be described with reference to FIG. 2 showing a timing chart.

While the circuit shown in FIG. 1 is operable by four phase clocks T0, T1, T2, T3, the clock T1 is not used in this embodiment.

When the forced error generating instruction for diagnosis is executed, data for a structural element in which error is forcibly produced are set (as data "0", "1", "2" or "3" in this embodiment) in the forcible error register 1 at the clock T3 of the last machine cycle of the forced error generating instruction signal 23. Forced error indication signals "0" to "3" are produced from the forced error register 1 in correspondence to the data "0" to "3".

In the last one machine cycle of the forced error generating instruction signal 23, the forced error generating instruction A signal 25 becomes "significant". The instruction A signal 25 is received in the latch 21 by the clock signal T2, whereby the forced error generating instruction B signal 26 becomes "significant". Then, the forced error controlling A signal 27 as an output from the forced error controlling circuit 20 becomes significant in synchronism with the forced error generating instruction B signal 26 which has been made significant. The forced error controlling A signal 27 is received in the latch 22 by the clock T0 in the first machine cycle of an instruction I subsequent to the forced error generating instruction, the clock T0 being in response to the instruction starting signal 24, whereby the forced error controlling B signal 28 becomes significant. The controlling B signal 28 is kept to be significant until the execution of the instruction I subsequent to the forced error generating instruction is completed. The forced error controlling circuit 20 makes forced error generating signals "0" to "3" (which correspond the values of the forced error designation signals "0" to "3" outputted from the forced error register 1) significant while the forced error controlling B signal 28 is significant, i.e., during a period of the execution of the instruction I subsequent to the forced error generating instruction. Under the normal condition that each of the forced error generating signals is not significant, the error generating circuit 3 outputs the parity 11 for the data "8" to "11" as the parity 12 which has the same polarity as the parity 11. However, for instance, when the forced error generating signal "0" is significant, it outputs a signal given by reversing the parity 11 as the parity 12. The error detecting circuit 4 receives the data "8" to "11" and the parity 12 to conduct a parity check. The error detecting circuit 4 makes the error detecting signal 13 significant when a parity error is detected. Accordingly, when the forced error generating signal "0" is significant, the parity 12 has an output given by reversing the parity 11 for the data "8" to "11", and the error detecting circuit 4 detects that a parity error takes place in the data "8" to "11", whereby the error detecting signal 13 is made significant. Thus, correct function of the error detecting circuit 4 can be confirmed.

In the above-mentioned embodiment, the error is forcibly produced only in one instruction period subsequent to the forced error generating instruction period by inputting the instruction starting signal 24 into the error controlling circuit 20. However, the forced error generating period can be changed by using a controlling signal other than the instruction starting signal 24.

Thus, in accordance with the present invention, the signal specifying a structural element in which error is forcibly produced in the data processing unit and the signal indicative of the forced error generating period are separately generated. Accordingly, even though an operation is not well acquainted with the function of instructions and hardware, errors can be forcibly produced. Further, the amount of the hardware can be reduced.

In addition, the forced error controlling circuit can be realized by a single programable LSI such as PLA. Also, the forced error generating period can be desirably changed by changing data for customers of each individual PLA.

Obviously, numerous modifications and variations of the present invention are possible in light of the above teachings. It is therefore to be understood that within the scope of the appended claims, the invention may be practiced otherwise than as specifically described herein.

What is claimed is:

1. A forced error generating circuit for a data processing unit comprising:

a forced error register for generating a designation signal to forcibly cause an error for a structural element in the data processing unit; and a signal generating means which receives a signal for starting a period for causing the error by way of an internal forced error generating instruction and generates a forced error generating signal corresponding to said designation signal during said period, wherein said signal for starting the period for forcibly causing error is an instruction starting signal, and wherein said generating means includes a forced error controlling circuit for generating a forced error generating instruction A signal in the last machine cycle of said forced error generating instruction, a first circuit for generating a forced error generating instruction B signal by latching said forced error generating instruction A signal in said last machine cycle and a second circuit for latching a forced error controlling B signal in response to said instruction starting signal, in the period of an instruction I subsequent to said forced error generating instruction when a forced error controlling A signal in synchronism with said forced error generating instruction B signal is generated from said forced error controlling circuit, whereby said forced error controlling circuit generates said forced error generating signal in response to said forced error controlling B signal.

* * * * *